(12) United States Patent
Akao et al.

(10) Patent No.: US 6,993,908 B2
(45) Date of Patent: Feb. 7, 2006

(54) FAILURE DETECTION APPARATUS FOR AN INTERNAL COMBUSTION ENGINE

(75) Inventors: Yoshiyuki Akao, Yokohama (JP); Susumu Kohketsu, Tokyo (JP)

(73) Assignee: Mitsubishi Fuso Truck and Bus Corporation

( * ) Notice: Subject to any disclaimer, the term of this patent is extended or adjusted under 35 U.S.C. 154(b) by 245 days.

(21) Appl. No.: 10/655,057

(22) Filed: Sep. 4, 2003

(65) Prior Publication Data

US 2004/0182079 A1 Sep. 23, 2004

(30) Foreign Application Priority Data

Sep. 6, 2002 (JP) .............................. 2002-261612

(51) Int. Cl.
*F02D 23/00* (2006.01)
*F02D 45/00* (2006.01)
*F02B 33/44* (2006.01)
*F02M 25/07* (2006.01)

(52) U.S. Cl. .......................... 60/602; 60/605.2; 60/601
(58) Field of Classification Search .......... 60/600–603, 60/605.2; 123/568.15, 568.16, 568.21, 676; 73/118.1, 118.3
See application file for complete search history.

(56) References Cited

U.S. PATENT DOCUMENTS

| 4,732,003 | A | * | 3/1988 | Ueno et al. ................... 60/602 |
| 4,870,942 | A | | 10/1989 | Shibata et al. .............. 123/676 |
| 6,062,025 | A | * | 5/2000 | Okada et al. ................. 60/602 |
| 6,178,749 | B1 | * | 1/2001 | Kolmanovsky et al. ..... 60/605.2 |
| 6,227,181 | B1 | | 5/2001 | Suzuki .................. 123/568.15 |
| 6,354,269 | B1 | * | 3/2002 | Saito et al. ............ 123/568.16 |
| 6,446,498 | B1 | * | 9/2002 | Schricker et al. ........... 73/118.1 |
| 6,625,985 | B2 | * | 9/2003 | Shirakawa .................... 60/602 |
| 6,715,287 | B1 | * | 4/2004 | Engel et al. .................. 60/601 |
| 6,837,227 | B2 | * | 1/2005 | Jaliwala et al. ........ 123/568.21 |
| 2005/0022524 | A1 | * | 2/2005 | Ando et al. .................... 60/602 |

FOREIGN PATENT DOCUMENTS

JP 10-18897 1/1998

* cited by examiner

*Primary Examiner*—Thai-Ba Trieu
(74) *Attorney, Agent, or Firm*—Rossi, Kimms & McDowell, LLP (57) ABSTRACT

A failure detection apparatus for an internal combustion engine includes failure detecting means (S22–S30) for detecting abnormality of fresh air quantity detecting means (air flow sensor) based on the result of comparison between a fresh air quantity detected by the fresh air quantity detecting means (air flow sensor) and a fresh air quantity reference value set by fresh air quantity reference value setting means (S20), and a supercharger equipped with variable nozzles/vanes. The fresh air quantity reference value setting means sets the reference value (S16) in accordance with not only the operating state (engine speed $N_e$, fuel injection quantity $Q_f$, etc.) of the engine but also a target vane opening set for the variable nozzles/vanes of the supercharger by target vane opening setting means (S12, S14).

16 Claims, 8 Drawing Sheets

FAILURE DETECTION APPARATUS FOR AN INTERNAL COMBUSTION ENGINE

BACKGROUND OF THE INVENTION

1. Field of the Invention

The present invention relates to a failure detection apparatus for an internal combustion engine, and more particularly, to techniques enabling reliable detection of abnormality in an air flow sensor.

2. Description of the Related Art

Recently, in order to prevent harmful exhaust gas from being emitted from an engine mounted on a motor vehicle, various control means are used to improve exhaust gas characteristics. These control means operate based on information supplied from various sensors and the like, to improve the exhaust gas characteristics.

If any of the sensors etc. fails, however, the exhaust gas characteristics may possibly be deteriorated, and accordingly, there has been a demand for reliable detection of failure of such sensors etc. Recently, vehicles equipped with an on-board diagnostic system (OBD etc.) have been developed and put to practical use, with a view to further improving the exhaust gas characteristics.

Information from the various sensors etc., especially, information from an air flow sensor (AFS) is used for many purposes including the control of an after-treatment device, EGR or exhaust gas recirculation, etc., and failure of the air flow sensor greatly affects the exhaust gas characteristics. Accordingly, diagnosis of the air flow sensor is of especial importance.

Thus, an apparatus has been proposed in which, when the rotation speed of the engine is lower than or equal to a predetermined value and at the same time an intake air quantity detected by the air flow sensor is higher than or equal to a predetermined value, for example, the air flow sensor is judged to be abnormal (see Japanese Patent Application Publication No. H10-018897, for example).

In such diagnosis of the air flow sensor, failure of the sensor is usually determined by comparing a reference value set in advance based on operating conditions, such as engine speed, fuel injection quantity, engine torque, throttle opening (throttle valve opening), manifold air pressure, etc., with an output value from the air flow sensor.

However, in the case where the exhaust flow rate (exhaust pressure) is adjusted by means of the variable nozzles/vanes of a variable nozzles/vanes-equipped supercharger (VG turbocharger) or where EGR gas is introduced into the intake system while the exhaust flow rate is adjusted by the variable nozzles/vanes, the quantity of fresh air varies depending on the vane opening of the variable nozzles/vanes or the opening of the EGR valve, giving rise to a problem that failure of the air flow sensor cannot be determined with accuracy.

To solve the problem, the diagnosis of the air flow sensor may be suspended while the vane opening or the EGR valve opening varies, for example. In the apparatus disclosed in the aforementioned publication, the diagnosis of the air flow sensor as to abnormality is prohibited when the engine is in a cold state in which the engine is supplied with bypass air.

Such suspension of the diagnosis is, however, not desirable because it leads to a substantial reduction in the period for diagnosing the air flow sensor.

SUMMARY OF THE INVENTION

The present invention was created to solve the above problems, and an object thereof is to provide a failure detection apparatus for an internal combustion engine which is capable of reliable detection of abnormality in an air flow sensor irrespective of vane opening control of a variable nozzles/vanes-equipped supercharger.

To achieve the object, a failure detection apparatus according to the present invention comprises: fresh air quantity detecting means arranged in an intake system of an internal combustion engine, for detecting a quantity of fresh air introduced into a combustion chamber of the engine; fresh air quantity reference value setting means for setting a reference value for the fresh air quantity in accordance with an operating state of the engine; failure detecting means for detecting abnormality of the fresh air quantity detecting means, based on a result of comparison between the fresh air quantity detected by the fresh air quantity detecting means and the reference value set by the fresh air quantity reference value setting means; a variable nozzles/vanes-equipped supercharger arranged across the intake and exhaust systems of the engine and having a turbine and a compressor, the turbine being operated by an exhaust stream whose flow rate has been adjusted by the variable nozzles/vanes, to drive the compressor and thereby supercharge the engine with intake air; target vane opening setting means for setting a target vane opening for the variable nozzles/vanes in accordance with the operating state of the engine such that an air-fuel ratio or excess air ratio of the exhaust system becomes equal to a predetermined value corresponding to the operating state; and vane opening control means for controlling the variable nozzles/vanes in accordance with the target vane opening set by the target vane opening setting means, wherein the fresh air quantity reference value setting means sets the reference value in accordance with not only the operating state of the engine but also the target vane opening set for the variable nozzles/vanes by the target vane opening setting means.

Thus, the reference value for the fresh air quantity is set by the fresh air quantity reference value setting means in accordance with the operating state (engine speed, fuel injection quantity, engine torque, throttle opening, manifold air pressure, etc.) of the engine, and based on the result of comparison between the thus-set reference value and the fresh air quantity detected by the fresh air quantity detecting means, abnormality or failure of the fresh air quantity detecting means (air flow sensor) is detected. In this case, the fresh air quantity reference value setting means sets the reference value in accordance with not only the operating state of the engine but also the target vane opening set for the variable nozzles/vanes by the target vane opening setting means.

Accordingly, the fresh air quantity reference value can be set taking account of the target vane opening, that is, the amount of exhaust flow rate adjusted by the variable nozzles/vanes. Proper and reliable diagnosis of the fresh air quantity detecting means can therefore be carried out irrespective of the exhaust flow rate adjustment, whereby reliability of the fresh air quantity detecting means can be enhanced, making it possible to further improve the exhaust gas characteristics, for example.

The failure detection apparatus of the present invention may further comprise exhaust concentration detecting means for detecting an exhaust concentration to thereby detect the air-fuel ratio or excess air ratio of the exhaust system, wherein the fresh air quantity reference value setting means corrects the target vane opening for the variable nozzles/vanes, based on a difference between the air-fuel ratio or excess air ratio of the exhaust system, detected by the exhaust concentration detecting means, and the predetermined value, and sets the reference value based on the corrected target vane opening.

Specifically, the target vane opening for the variable nozzles/vanes is a command value which is set in accordance with the operating state (engine speed, fuel injection quantity, etc.) of the engine such that the air-fuel ratio or excess air ratio of the exhaust system becomes equal to the predetermined value corresponding to the operating state, and thus the target vane opening may possibly be different from an actual opening. Accordingly, the target vane opening for the variable nozzles/vanes is corrected based on the difference between the air-fuel ratio or excess air ratio of the exhaust system, detected by the exhaust concentration detecting means, and the predetermined value, and the reference value is set based on the corrected target vane opening.

Consequently, the fresh air quantity reference value can be set to a proper value matching the actual opening of the variable nozzles/vanes, whereby the fresh air quantity detecting means can be diagnosed with higher accuracy during operation of the variable nozzles/vanes, making it possible to further improve the reliability of the fresh air quantity detecting means.

The failure detection apparatus of the present invention may further comprise exhaust concentration detecting means for detecting an exhaust concentration to thereby detect the air-fuel ratio or excess air ratio of the exhaust system, wherein the vane opening control means corrects the opening of the variable nozzles/vanes such that the air-fuel ratio or excess air ratio of the exhaust system, detected by the exhaust concentration detecting means, coincides with the predetermined value.

As mentioned above, the target vane opening for the variable nozzles/vanes may possibly be different from an actual opening, and therefore, the opening of the variable nozzles/vanes is corrected such that the air-fuel ratio or excess air ratio of the exhaust system, detected by the exhaust concentration detecting means, coincides with the predetermined value.

Accordingly, the fresh air quantity reference value can be set to a proper value matching the actual opening of the variable nozzles/vanes, whereby the fresh air quantity detecting means can be diagnosed with higher accuracy during the operation of the variable nozzles/vanes, making it possible to further improve the reliability of the fresh air quantity detecting means.

The failure detection apparatus of the present invention may further comprise exhaust concentration detecting means for detecting an exhaust concentration to thereby detect the air-fuel ratio or excess air ratio of the exhaust system, wherein, when the air-fuel ratio or excess air ratio of the exhaust system, detected by the exhaust concentration detecting means, is different from the predetermined value, the fresh air quantity reference value setting means suspends the control of the variable nozzles/vanes by the vane opening control means and sets the reference value based solely on the operating state of the engine.

The target vane opening for the variable nozzles/vanes may possibly be different from an actual opening, as mentioned above, and therefore, when the air-fuel ratio or excess air ratio of the exhaust system, detected by the exhaust concentration detecting means, is different from the predetermined value, the control of the variable nozzles/vanes is suspended.

In this case, the fresh air quantity reference value is set based solely on the operating state of the engine, to enhance the accuracy of diagnosis of the fresh air quantity detecting means without reducing the occasion for diagnosis, whereby the reliability of the fresh air quantity detecting means can be further improved.

According to another aspect of the present invention, a failure detection apparatus comprises: fresh air quantity detecting means arranged in an intake system of an internal combustion engine, for detecting a quantity of fresh air introduced into a combustion chamber of the engine; fresh air quantity reference value setting means for setting a reference value for the fresh air quantity in accordance with an operating state of the engine; failure detecting means for detecting abnormality of the fresh air quantity detecting means, based on a result of comparison between the fresh air quantity detected by the fresh air quantity detecting means and the reference value set by the fresh air quantity reference value setting means; a variable nozzles/vanes-equipped supercharger arranged across the intake and exhaust systems of the engine and having a turbine and a compressor, the turbine being operated by an exhaust stream whose flow rate has been adjusted by the variable nozzles/vanes, to drive the compressor and thereby supercharge the engine with intake air; target vane opening setting means for setting a target vane opening for the variable nozzles/vanes in accordance with the operating state of the engine such that an air-fuel ratio or excess air ratio of the exhaust system becomes equal to a predetermined value corresponding to the operating state; vane opening control means for controlling the variable nozzles/vanes in accordance with the target vane opening set by the target vane opening setting means; an EGR passage for allowing part of exhaust gas to be recirculated from the exhaust system of the engine to the intake system as EGR gas; an EGR valve inserted in the EGR passage, for adjusting a quantity of the EGR gas by varying an opening thereof; target EGR valve opening setting means for setting a target EGR valve opening for the EGR valve in accordance with the operating state of the engine such that the air-fuel ratio or excess air ratio of the exhaust system becomes equal to the predetermined value; and EGR valve control means for controlling the EGR valve in accordance with the target EGR valve opening set by the target EGR valve opening setting means, wherein the fresh air quantity reference value setting means sets the reference value in accordance with not only the operating state of the engine but also the target vane opening set for the variable nozzles/vanes by the target vane opening setting means and the target EGR valve opening set by the target EGR valve opening setting means.

Thus, the reference value for the fresh air quantity is set by the fresh air quantity reference value setting means in accordance with the operating state (engine speed, fuel injection quantity, engine torque, throttle opening, manifold air pressure, etc.) of the engine, and based on the result of comparison between the thus-set reference value and the fresh air quantity detected by the fresh air quantity detecting means, abnormality or failure of the fresh air quantity detecting means (air flow sensor) is detected. In this case, the fresh air quantity reference value setting means sets the reference value in accordance with not only the operating state of the engine but also the target vane opening set for the variable nozzles/vanes by the target vane opening setting means and the target EGR valve opening set by the target EGR valve opening setting means.

Accordingly, the fresh air quantity reference value can be set taking account of the target vane opening, that is, the amount of exhaust flow rate adjusted by the variable nozzles/vanes, and the target EGR valve opening, that is, the EGR gas quantity. Proper and reliable diagnosis of the fresh air quantity detecting means can therefore be carried out irrespective of the adjustment of exhaust flow rate or the introduction of EGR gas, whereby the reliability of the fresh air quantity detecting means can be enhanced, making it possible to further improve the exhaust gas characteristics, for example.

The failure detection apparatus of the present invention may further comprise exhaust concentration detecting means for detecting an exhaust concentration to thereby detect the air-fuel ratio or excess air ratio of the exhaust system, wherein the fresh air quantity reference value setting means corrects at least one of the target vane opening and the target EGR valve opening based on a difference between the air-fuel ratio or excess air ratio of the exhaust system, detected by the exhaust concentration detecting means, and the predetermined value, and sets the reference value based on said at least one of the corrected target vane opening and the corrected target EGR valve opening.

Specifically, the target vane opening for the variable nozzles/vanes and the target EGR valve opening for the EGR valve are each a command value which is set in accordance with the operating state (engine speed, fuel injection quantity, etc.) of the engine such that the air-fuel ratio or excess air ratio of the exhaust system becomes equal to the predetermined value corresponding to the operating state, and may possibly be different from their actual openings. Thus, the target vane opening for the variable nozzles/vanes and the target EGR valve opening are corrected based on the difference between the air-fuel ratio or excess air ratio of the exhaust system, detected by the exhaust concentration detecting means, and the predetermined value, and the reference value is set based on the corrected target vane opening and the corrected target EGR valve opening.

Accordingly, the fresh air quantity reference value can be set to a proper value matching the actual opening of the variable nozzles/vanes and the actual EGR valve opening, and thus the fresh air quantity detecting means can be diagnosed with higher accuracy, making it possible to further improve the reliability of the fresh air quantity detecting means.

The failure detection apparatus of the present invention may further comprise exhaust concentration detecting means for detecting an exhaust concentration to thereby detect the air-fuel ratio or excess air ratio of the exhaust system, wherein the vane opening control means corrects the opening of the variable nozzles/vanes such that the air-fuel ratio or excess air ratio of the exhaust system, detected by the exhaust concentration detecting means, coincides with the predetermined value, and the EGR valve control means corrects the opening of the EGR valve such that the air-fuel ratio or excess air ratio of the exhaust system, detected by the exhaust concentration detecting means, coincides with the predetermined value.

As mentioned above, the target vane opening for the variable nozzles/vanes and the target EGR valve opening for the EGR valve may possibly be different from an actual vane opening and an actual EGR valve opening, respectively. Thus, the opening of the variable nozzles/vanes and the EGR valve opening are corrected such that the air-fuel ratio or excess air ratio of the exhaust system, detected by the exhaust concentration detecting means, coincides with the predetermined value.

Accordingly, the fresh air quantity reference value can be set to a proper value matching the actual opening of the variable nozzles/vanes and the actual EGR valve opening, and thus the fresh air quantity detecting means can be diagnosed with higher accuracy, making it possible to further improve the reliability of the fresh air quantity detecting means.

The failure detection apparatus of the present invention may further comprise exhaust concentration detecting means for detecting an exhaust concentration to thereby detect the air-fuel ratio or excess air ratio of the exhaust system, wherein, when the air-fuel ratio or excess air ratio of the exhaust system, detected by the exhaust concentration detecting means, is different from the predetermined value, the fresh air quantity reference value setting means suspends the control of the variable nozzles/vanes by the vane opening control means as well as the control of the EGR valve by the EGR valve control means and sets the reference value based solely on the operating state of the engine.

The target vane opening for the variable nozzles/vanes and the target EGR valve opening for the EGR valve may possibly be different from an actual vane opening and an actual EGR valve opening, respectively. Thus, when the air-fuel ratio or excess air ratio of the exhaust system, detected by the exhaust concentration detecting means, is different from the predetermined value, the control of the variable nozzles/vanes and the control of the EGR valve are suspended.

In this case, the fresh air quantity reference value is set based solely on the operating state of the engine, to enhance the accuracy of diagnosis of the fresh air quantity detecting means without reducing the occasion for diagnosis, whereby the reliability of the fresh air quantity detecting means can be further improved.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Embodiments of the present invention will be hereinafter described with reference to the accompanying drawings.

Figure 1:
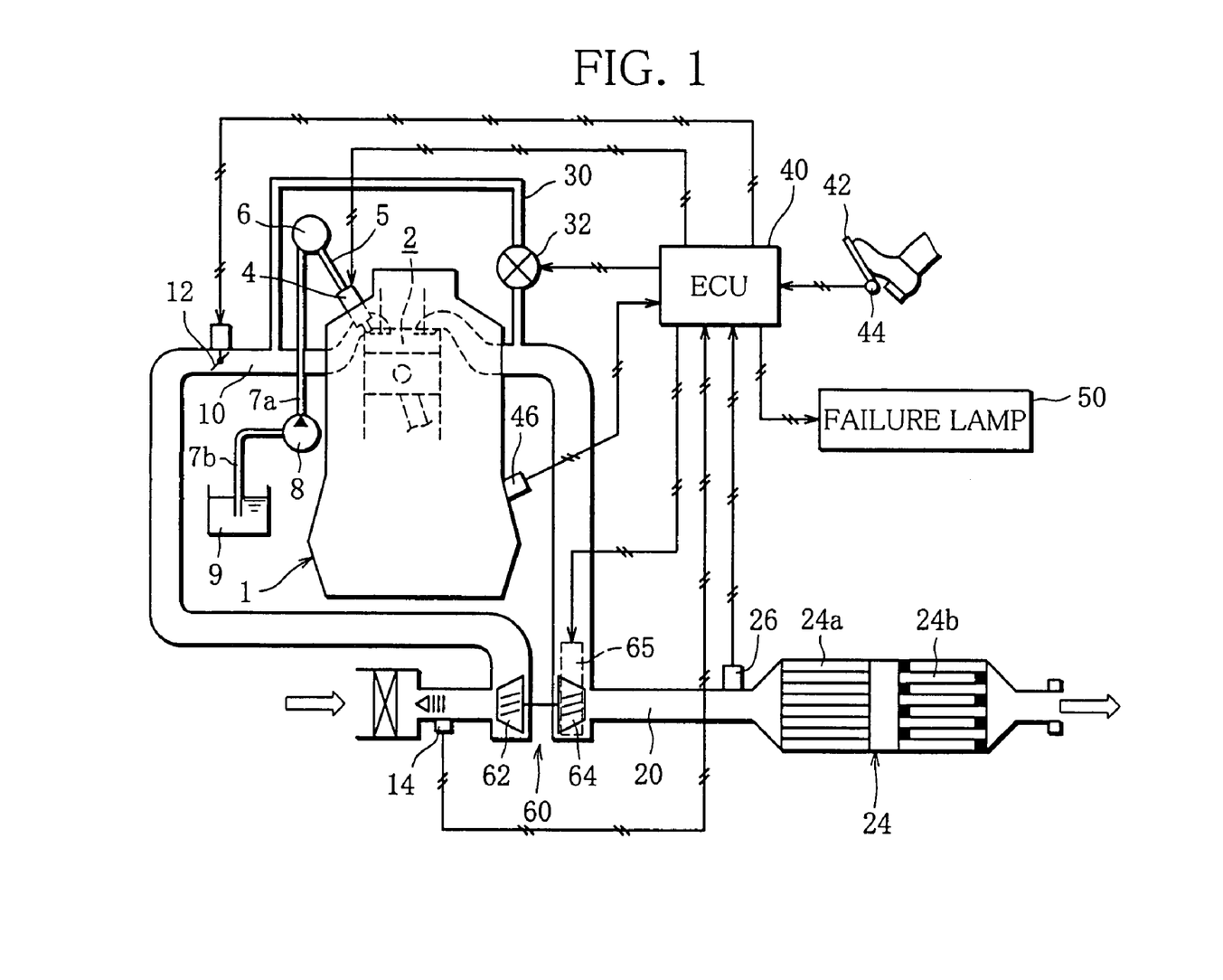
FIG. 1 is a diagram illustrating a schematic arrangement of a failure detection apparatus for an internal combustion engine according to the present invention.

FIG. 1 illustrates a schematic arrangement of a failure detection apparatus for an internal combustion engine according to the present invention. The arrangement of the failure detection apparatus of the present invention will be described first with reference to FIG. 1.

As shown in FIG. 1, an internal combustion engine 1 is a common-rail in-line four-cylinder diesel engine, for example. In the common-rail engine 1, a solenoid-operated fuel injection nozzle 4 is provided for each cylinder so as to face a corresponding combustion chamber 2 and is connected through a high-pressure pipe 5 to a common rail 6. The common rail 6 is connected through a high-pressure pipe 7a to a high-pressure pump 8, which is connected to a fuel tank 9 through a low-pressure pipe 7b. Since the engine 1 is a diesel engine, light oil is used as fuel.

A solenoid-operated intake throttle valve 12 is arranged in an intake passage 10 of the engine 1. On an upstream side of the intake throttle valve 12 is provided an air flow sensor (AFS; fresh air quantity detecting means) 14 for outputting a signal $S_{afs}$ based on which a fresh air quantity $Q_a$ is detected. The intake throttle valve 12 comprises a butterfly valve, for example. Also, in the illustrated engine, a Karman vortex air flow sensor is used as the air flow sensor 14 by way of example, but a hot-wire air flow sensor or the like may be used instead.

An after-treatment device 24 is inserted in an exhaust passage 20. The after-treatment device 24 comprises, for example, a continuously regenerating DPF including a diesel particulate filter (DPF) 24b and an oxidation catalyst 24a arranged on an upstream side of the DPF 24b.

In the continuously regenerating DPF, an oxidizer ($NO_2$) is produced in the oxidation catalyst 24a and is used to continuously remove particulate matter (PM) deposited on the downstream-side DPF 24b by oxidation under a relatively high exhaust gas temperature condition, to thereby regenerate the DPF 24b.

A λ sensor ($O_2$ sensor etc.; exhaust concentration detecting means) 26 is attached to the exhaust passage 20 at a location upstream of the after-treatment device 24, to detect an excess air ratio λ of the exhaust system through detection of the oxygen concentration of exhaust gas. Instead of detecting the excess air ratio λ, the air-fuel ratio may be detected, and in this case, an air-fuel ratio sensor (LAFS etc.) is used in place of the λ sensor 26.

Figure 2:
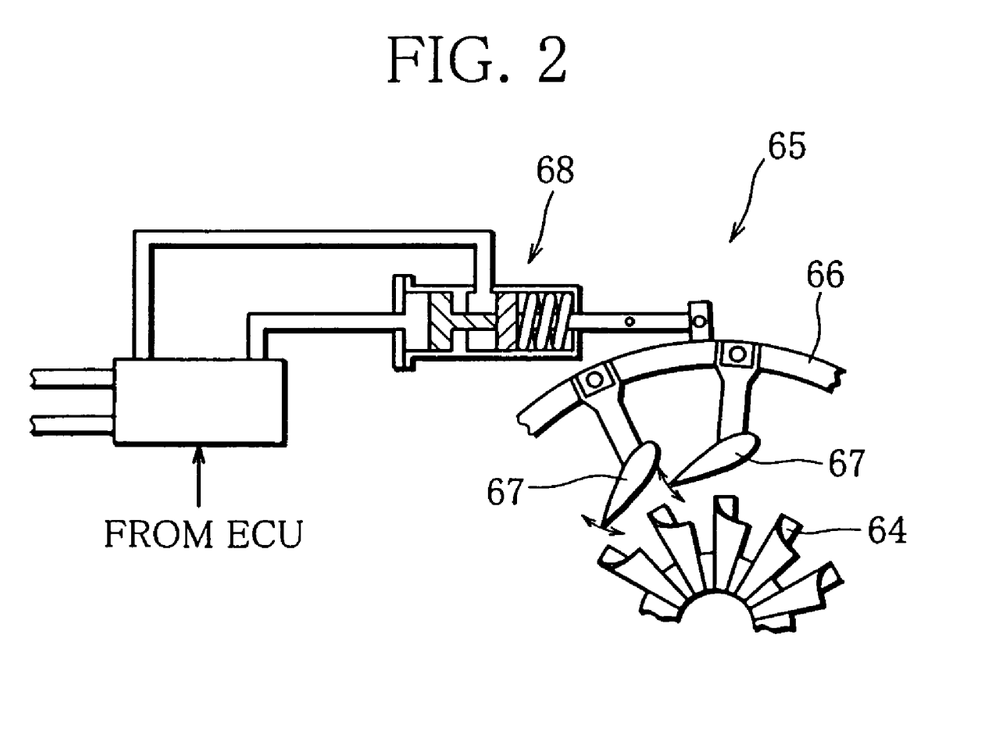
FIG. 2 is a schematic view showing a variable nozzle/vane unit of a variable nozzles/vanes-equipped turbocharger.

A variable nozzles/vanes-equipped turbocharger (variable nozzles/vanes-equipped supercharger, VG turbocharger) 60 is arranged across the exhaust and intake passages 20 and 10, and has a turbine 64 situated in the exhaust passage 20 and a compressor 62 situated in the intake passage 10. The variable nozzles/vanes-equipped turbocharger 60 also includes a variable nozzle/vane unit 65, and as shown in FIG. 2, variable nozzles/vanes 67 are opened and closed, as indicated by the arrows, by an actuator unit 68 through a vane operating mechanism 66, to adjust the exhaust flow rate (exhaust pressure). Accordingly, even in cases where the engine speed $N_e$ or engine load is low and thus the exhaust flow rate is low, sufficient boost pressure can be obtained by reducing the opening of the variable nozzles/vanes 67.

An EGR passage 30 extends from a portion of the exhaust passage 20 near the engine 1, to allow part of the exhaust gas to be recirculated to the intake system as EGR gas. The EGR passage 30 is connected at the other end to a portion of the intake passage 10 located downstream of the intake throttle valve 12. A solenoid-operated EGR valve 32 of which the opening can be adjusted to a desired opening is inserted in the EGR passage 30.

An electronic control unit (ECU) 40 is connected at an input side thereof with various sensors which include an accelerator position sensor (APS) 44 for detecting the stroke of an accelerator pedal 42, that is, accelerator position $\theta_{acc}$, and a crank angle sensor 46 for detecting the engine speed $N_e$ through detection of crank angle, besides the air flow sensor 14 and the λ sensor 26.

The output side of the ECU 40 is connected with various devices including a failure lamp 50 for indicating a variety of failure statuses, in addition to the fuel injection nozzles 4, intake throttle valve 12, EGR valve 32, and actuator unit 68 of the variable nozzle/vane unit 65.

Based on information input from the various sensors, operations of the various devices are controlled to properly control the operation of the engine 1. For example, based on the information from the accelerator position sensor 44, air flow sensor 14 and λ sensor 26, a fuel injection quantity $Q_f$ as well as the opening of the intake throttle valve 12 are adjusted to control the operation of the engine 1, whereby not only the control of normal engine operation but the regeneration control of the after-treatment device 24, the opening control (vane opening control means) of the variable nozzles/vanes 67, the opening control (EGR valve control means) of the EGR valve 32, etc. are carried out.

Operation of the failure detection apparatus for the engine configured as above will be now described.

A first embodiment will be explained first.

Figure 3:
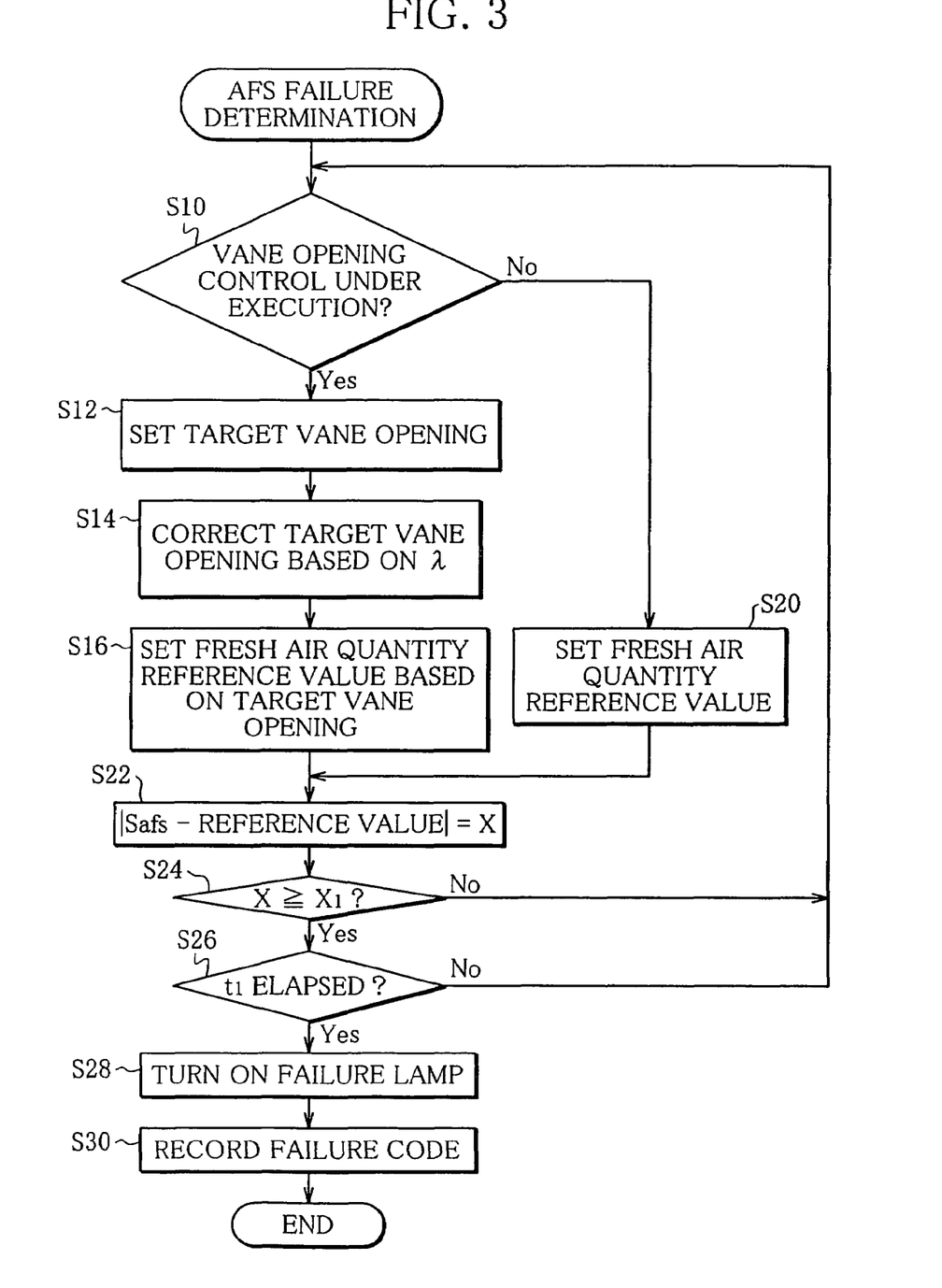
FIG. 3 is a flowchart illustrating a control routine for air flow sensor (AFS) failure determination according to a first embodiment of the present invention.

FIG. 3 is a flowchart illustrating a control routine for air flow sensor (AFS) failure determination, executed in the failure detection apparatus according to the first embodiment of the present invention. The control routine will be described with reference to the flowchart.

First, in Step S10, it is determined whether or not vane opening control is under execution, that is, whether or not the exhaust flow rate (exhaust pressure) is being adjusted by controlling the opening of the variable nozzles/vanes 67. Specifically, it is determined whether or not the vane opening control is performed to secure sufficient boost pressure in such a situation where the engine speed $N_e$ or engine load is low and thus the exhaust flow rate is low. If the decision in this step is affirmative (Yes) and thus the vane opening control is under execution, the routine proceeds to Step S12.

In Step S12, a target vane opening for the variable nozzles/vanes 67 is set. In this instance, the target vane opening is set (target vane opening setting means) in accordance with the engine speed $N_e$ and the engine load, that is, the accelerator position $\theta_{acc}$. Usually, a target value (predetermined value) $\lambda_1$ for the excess air ratio λ is also set in accordance with the operating state of the engine 1, and as the opening of the variable nozzles/vanes 67 changes, the exhaust gas or EGR gas is recirculated into the combustion chamber 2 due to increase in the exhaust pressure, with the result that the excess air ratio λ varies depending on the EGR quantity. Accordingly, the fuel injection quantity $Q_f$ also is controlled in accordance with the target vane opening so that the excess air ratio $\lambda$ may be kept at the target value $\lambda_1$. In other words, the target vane opening is set while controlling the excess air ratio $\lambda$ to the target value $\lambda_1$. In practice, a map showing the relationship of the target vane opening with the engine speed $N_e$, fuel injection quantity $Q_f$ and target value $\lambda_1$ is prepared beforehand by experiment, and as soon as the target vane opening is set, an appropriate fuel injection quantity $Q_f$ is read from the map.

In Step S14, the target vane opening set in the aforementioned manner is corrected based on an actual excess air ratio $\lambda$ detected by the $\lambda$ sensor 26. The target vane opening is merely a command value from the ECU 40 and is not an actual value. Thus, even if the opening of the variable nozzles/vanes 67 is controlled so as to coincide with the target vane opening corresponding to the target value $\lambda_1$, a difference can occasionally arise between the actual opening of the variable nozzles/vanes 67 and the target vane opening. Such an opening difference leads to increased or decreased air quantity, causing a similar difference between the target value $\lambda_1$ and the actual excess air ratio $\lambda$. Accordingly, the target value $\lambda_1$ is compared with the actual excess air ratio $\lambda$, and based on the result of comparison, the target vane opening is corrected so as to match the actual opening.

Specifically, a difference (absolute value) $|\lambda-\lambda_1|$ between the target value $\lambda_1$ and the actual excess air ratio $\lambda$ detected by the $\lambda$ sensor 26 is obtained, and the target vane opening is corrected by an amount corresponding to the difference. The corrected target vane opening obtained in this manner may be stored as a learned value.

Consequently, the target vane opening is corrected to a proper value matching the actual opening of the variable nozzles/vanes 67.

In Step S16, a reference value for the fresh air quantity $Q_a$, that is, a fresh air quantity reference value, is set (fresh air quantity reference value setting means) in accordance with the target vane opening appropriately corrected as described above. Basically, the reference value for the fresh air quantity $Q_a$, or the fresh air quantity reference value, is set in accordance with the operating state (engine speed $N_e$, fuel injection quantity $Q_f$, engine torque, throttle valve opening (throttle opening), manifold air pressure, etc.) of the engine 1. In this step, the fresh air quantity reference value thus set is corrected by using the target vane opening. In practice, a map showing the relationship between fresh air quantity $Q_a{'}$ applicable during the vane opening control and the target vane opening is prepared beforehand, and an appropriate fresh air quantity $Q_a{'}$ read from the map is set as the fresh air quantity reference value.

Since the target vane opening has been corrected to a proper value matching the actual opening of the variable nozzles/vanes 67, as mentioned above, the fresh air quantity reference value can be set to a highly accurate value as in the case where the exhaust flow rate is not adjusted with the variable nozzles/vanes 67 kept inoperative.

If the decision in Step S10 is negative (No) and it is judged that the vane opening control is not under execution, the routine proceeds to Step S20.

In this case, a fresh air quantity $Q_a$ normally obtained in accordance with the operating state of the engine 1 is set directly as the fresh air quantity reference value, without regard to the target vane opening.

In Step S22, a difference (absolute value) $|S_{afs}$–reference value$|$ between the output signal $S_{afs}$ of the air flow sensor 14 and the fresh air quantity reference value is derived as X ($|S_{afs}$–reference value$|$=X). Namely, if the air flow sensor 14 is functioning normally, its output signal $S_{afs}$ should coincide with the fresh air quantity reference value. In the event the output signal $S_{afs}$ differs from the fresh air quantity reference value, the difference is derived as X in this step.

Then, in Step S24, it is determined whether or not the difference X has a value larger than or equal to a predetermined value $X_1$ (very small value) ($X \geq X_1$).

If the decision in Step S24 is affirmative (Yes) and it is judged that the difference X is larger than or equal to the predetermined value $X_1$, it can be concluded that the air flow sensor 14 is not functioning normally and is in an abnormal state and that failure of the air flow sensor 14 has occurred (failure detecting means). In this case, therefore, it is ascertained in Step S26 that the difference X remains larger than or equal to the predetermined value $X_1$ for a predetermined time $t_1$, and in Step S28, the failure lamp 50 is turned on to notify the driver of the failure of the air flow sensor 14. Also, in Step S30, a failure code corresponding to the failure of the air flow sensor 14 is recorded in a memory within the ECU 40.

Since the fresh air quantity reference value, in particular, is set with high accuracy based on the proper target vane opening just as in the case where the variable nozzles/vanes 67 are not operated, failure of the air flow sensor 14 can be detected with precision, regardless of the adjustment of the exhaust flow rate through operation of the variable nozzles/vanes 67, and the reliability of the air flow sensor 14 can be improved. Thus, in cases where the output information from the air flow sensor 14 is used for controlling the regeneration of the after-treatment device 24, the regeneration can be controlled optimally, making it possible to further improve the exhaust gas characteristics.

If the decision in Step S24 is negative (No) and it is judged that the difference X is smaller than the predetermined value $X_1$ (very small value), it can be concluded that the air flow sensor 14 is functioning normally without failure, and thus the subsequent steps of the routine are not executed.

A second embodiment will be now described.

Figure 4:
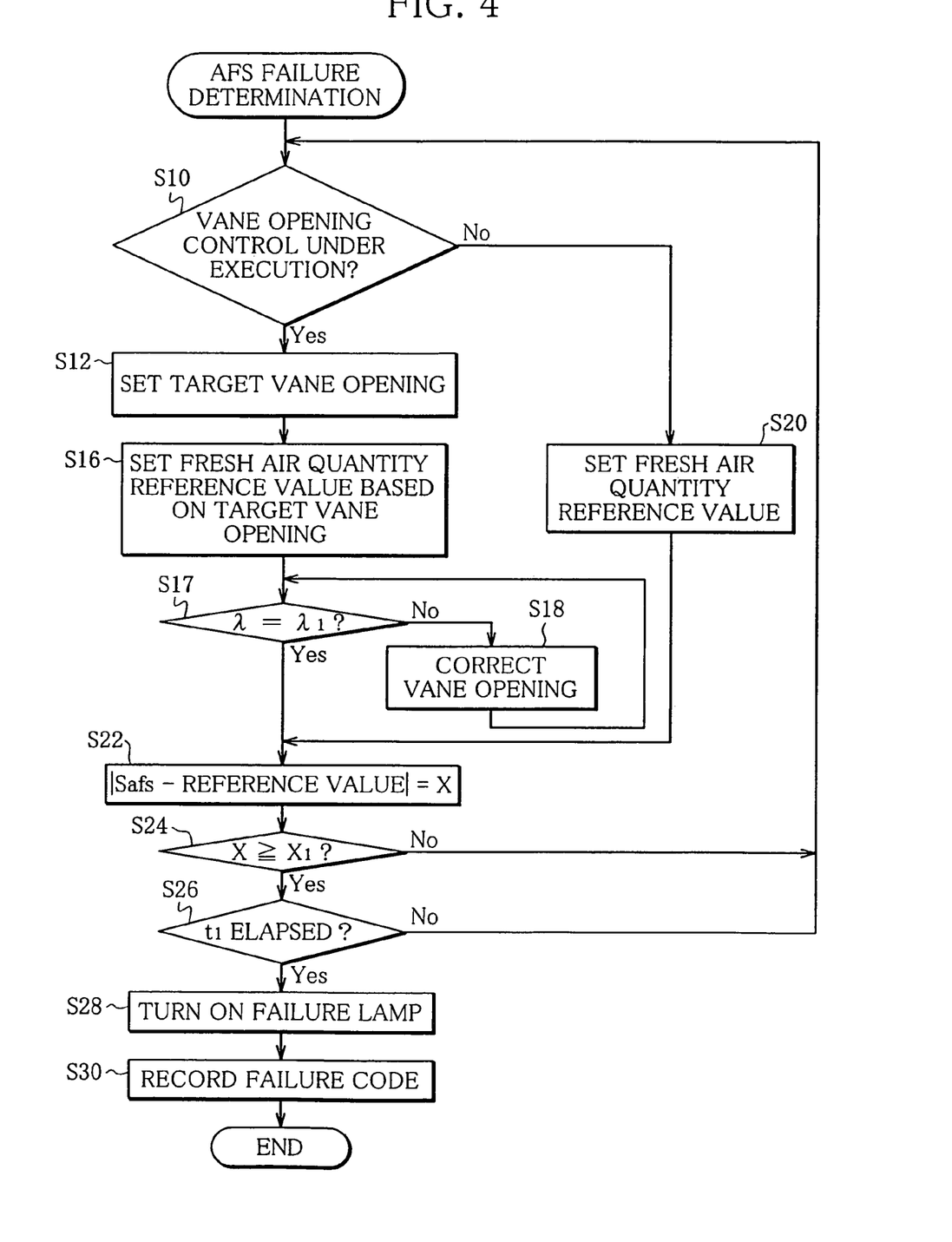
FIG. 4 is a flowchart illustrating another control routine for AFS failure determination according to a second embodiment of the present invention.

FIG. 4 is a flowchart illustrating a control routine for air flow sensor (AFS) failure determination, executed in the failure detection apparatus according to the second embodiment of the present invention. In the following description of the flowchart, only the differences between the first and second embodiments will be explained.

In the second embodiment, after the target vane opening is set in Step S12, the fresh air quantity reference value is set immediately thereafter based on the target vane opening in Step S16, without correcting the target vane opening, unlike the first embodiment.

Then, in Step S17, it is determined whether or not the actual excess air ratio $\lambda$ detected by the $\lambda$ sensor 26 is equal to the target value $\lambda_1$ ($\lambda=\lambda_1$). In other words, it is determined whether or not a difference between the target value $\lambda_1$ and the actual excess air ratio $\lambda$ has been caused due to an opening difference between the actual opening of the variable nozzles/vanes 67 and the target vane opening.

If the decision in Step S17 is affirmative (Yes) and it is judged that the actual excess air ratio $\lambda$ and the target value $\lambda_1$ are equal, it can be concluded that the target vane opening has been set to a proper value matching the actual opening of the variable nozzles/vanes 67, and accordingly, the routine proceeds to Step S22.

On the other hand, if the decision in Step S17 is negative (No) and it is judged that the actual excess air ratio $\lambda$ and the target value $\lambda_1$ differ from each other, the opening of the variable nozzles/vanes 67 is corrected, in Step S18, such that the actual excess air ratio λ becomes equal to the target value $λ_1$.

Namely, in the first embodiment, the target vane opening is corrected so as to match the actual opening of the variable nozzles/vanes 67. In the second embodiment, the actual opening of the variable nozzles/vanes 67 is corrected so as to match the target vane opening.

Thus, the actual opening of the variable nozzles/vanes 67 is corrected to a proper value matching the target vane opening, and accordingly, the fresh air quantity reference value can be set to a highly accurate value as in the case where the variable nozzles/vanes 67 are not operated.

Consequently, failure of the air flow sensor 14 can be detected with precision, regardless of the adjustment of the exhaust flow rate through operation of the variable nozzles/vanes 67, and the reliability of the air flow sensor 14 can be improved. In cases where the information from the air flow sensor 14 is used for controlling the regeneration of the after-treatment device 24, therefore, the regeneration can be controlled optimally, making it possible to further improve the exhaust gas characteristics.

A third embodiment will be now described.

Figure 5:
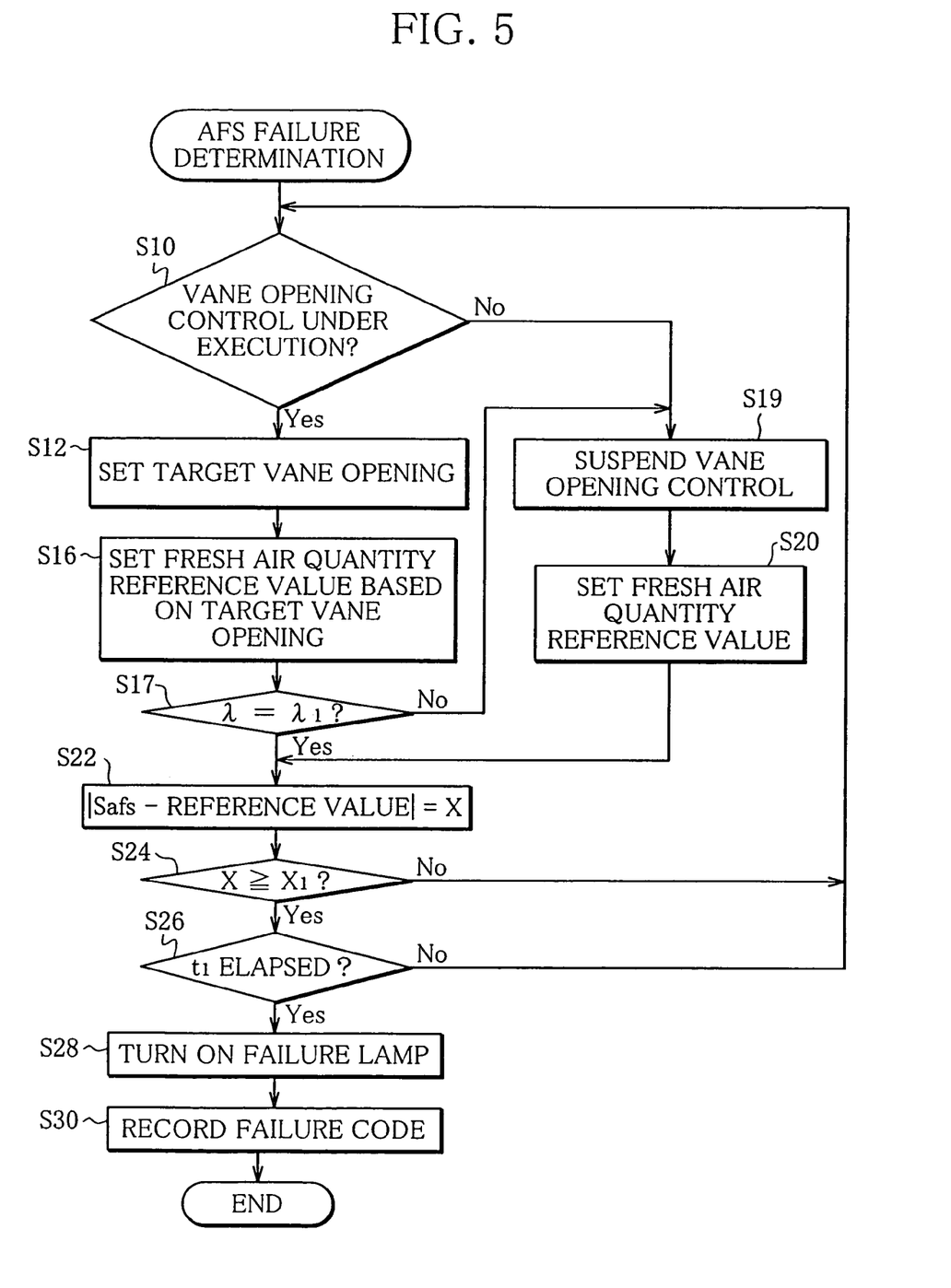
FIG. 5 is a flowchart illustrating still another control routine for AFS failure determination according to a third embodiment of the present invention.

FIG. 5 is a flowchart illustrating a control routine for air flow sensor (AFS) failure determination, executed in the failure detection apparatus according to the third embodiment. In the following description of the flowchart, only the differences between the third embodiment and the first or second embodiment will be explained.

In the third embodiment, after the target vane opening is set in Step S12, the fresh air quantity reference value is set immediately thereafter based on the target vane opening in Step S16, like the second embodiment.

Then, in Step S17, it is determined whether or not the actual excess air ratio λ detected by the λ sensor 26 is equal to the target value $λ_1$ ($λ=λ_1$), as in the second embodiment.

If the decision in Step S17 is affirmative (Yes) and it is judged that the actual excess air ratio λ and the target value $λ_1$ are equal, it can be concluded that the target vane opening has been set to a proper value matching the actual opening of the variable nozzles/vanes 67, and accordingly, the routine proceeds to Step S22.

On the other hand, if the decision in Step S17 is negative (No) and it is judged that the actual excess air ratio λ and the target value $λ_1$ differ from each other, the vane opening control is suspended in Step S19, then a normally obtained fresh air quantity $Q_a$ is directly set as the fresh air quantity reference value in Step S20, and the routine proceeds to Step S22.

Namely, in the third embodiment, if there is a difference between the actual excess air ratio λ and the target value $λ_1$, it is concluded that the fresh air quantity reference value cannot be set with accuracy, and the vane opening control itself is suspended. Thus, using the fresh air quantity $Q_a$ normally obtained in accordance with the operating state of the engine 1 as the fresh air quantity reference value, the air flow sensor 14 is diagnosed, without operating the variable nozzles/vanes 67, that is, without adjusting the exhaust flow rate.

In this case, the diagnosis of the air flow sensor 14 is not suspended but is continuously performed even while the vane opening control is suspended, whereby the occasion for diagnosis is not reduced.

Consequently, the fresh air quantity reference value can always be set to an accurate value, regardless of the degree to which the exhaust flow rate is adjusted by operating the variable nozzles/vanes 67. Thus, failure of the air flow sensor 14 can be detected with precision, making it possible to improve the reliability of the air flow sensor 14.

Fourth to sixth embodiments will be now described.

Figure 6:
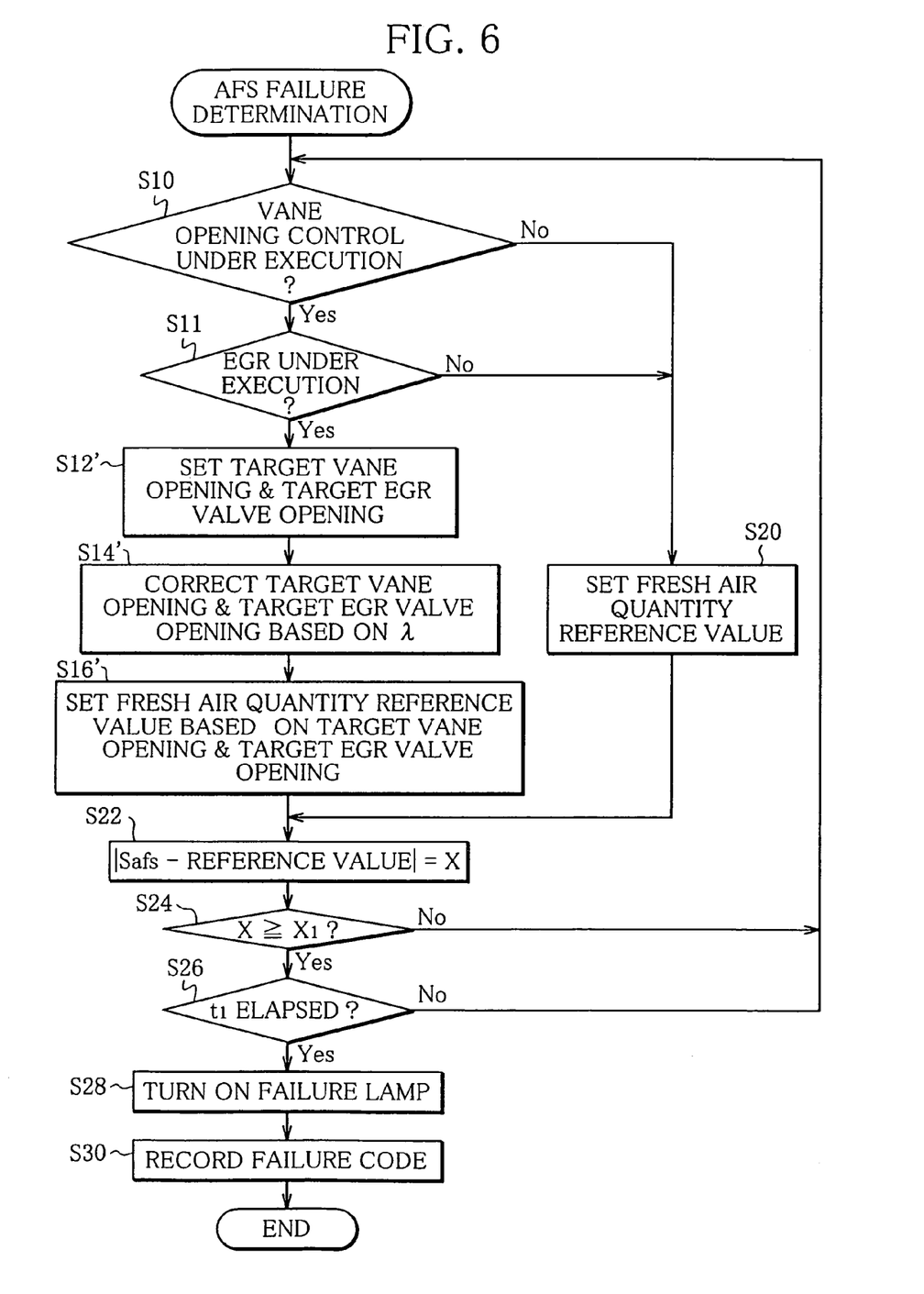
FIG. 6 is a flowchart illustrating yet another control routine for AFS failure determination according to a fourth embodiment of the present invention.
Figure 7:
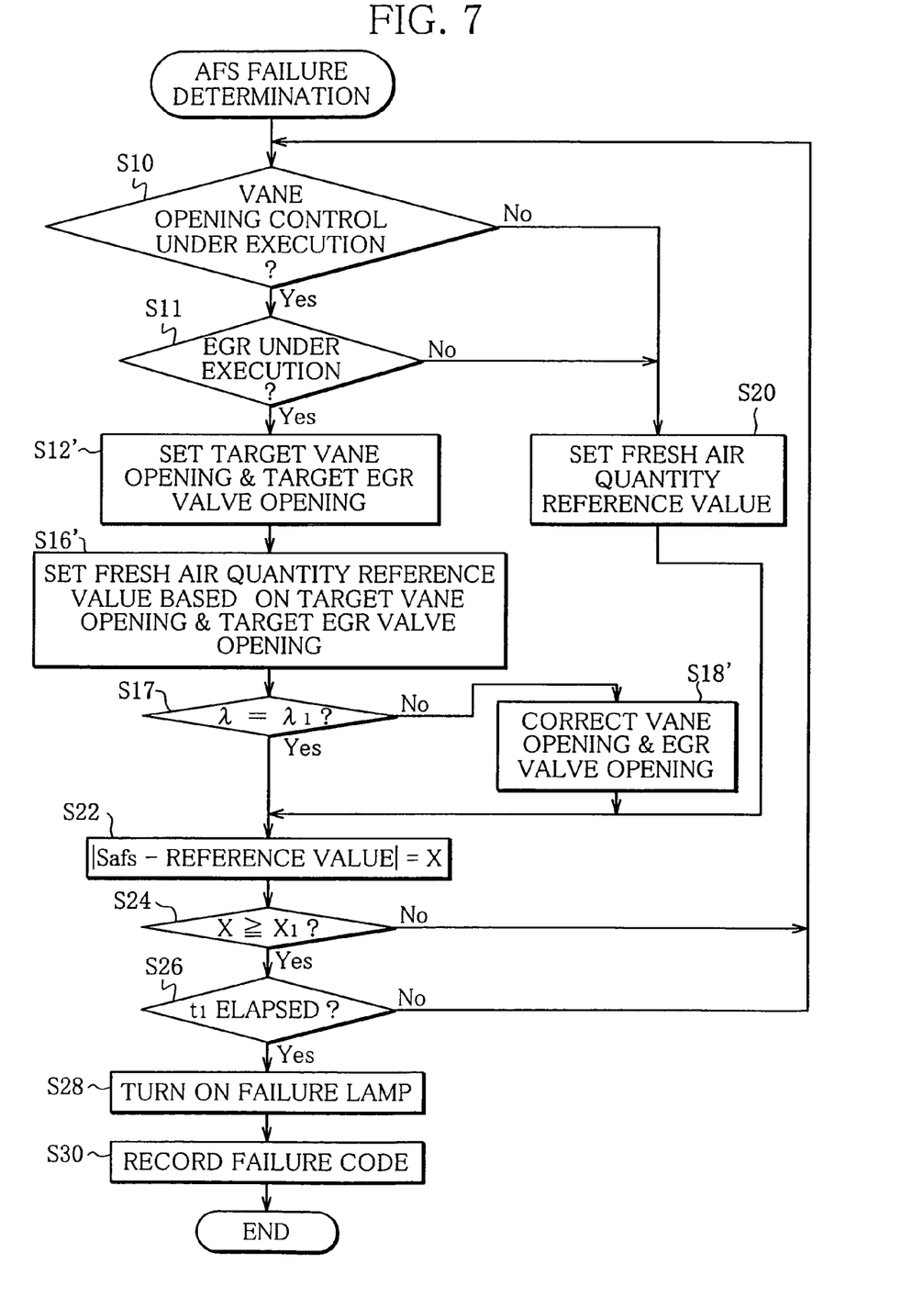
FIG. 7 is a flowchart illustrating a further control routine for AFS failure determination according to a fifth embodiment of the present invention.
Figure 8:
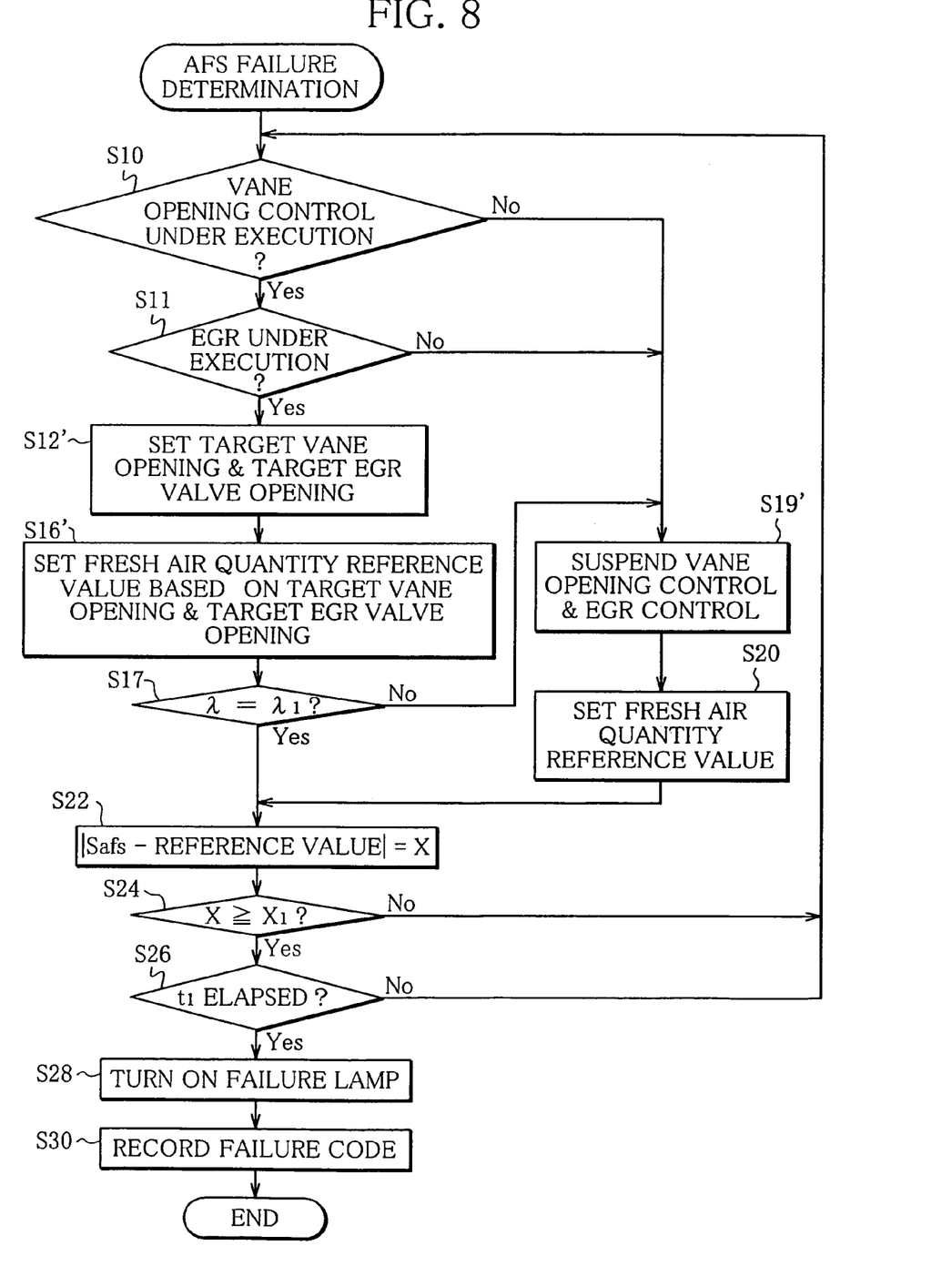
FIG. 8 is a flowchart illustrating a still further control routine for AFS failure determination according to a sixth embodiment of the present invention.

In the fourth to sixth embodiments, failure of the air flow sensor is determined taking account of not only the vane opening control, as in the first to third embodiments described above, but also EGR control. The fourth to sixth embodiments correspond to the first to third embodiments, respectively.

FIG. 6 is a flowchart illustrating a control routine for air flow sensor (AFS) failure determination, executed in the failure detection apparatus according to the fourth embodiment of the present invention. In the following description of the flowchart, only the differences between the fourth and first embodiments will be explained.

First, in Step S10, it is determined whether or not the vane opening control is under execution, that is, whether or not the exhaust flow rate (exhaust pressure) is being adjusted by controlling the opening of the variable nozzles/vanes 67, as in the foregoing embodiments. If the decision in this step is affirmative (Yes) and thus the vane opening control is under execution, the routine proceeds to Step S11.

In Step S11, it is determined whether or not the EGR is under execution, that is, whether or not the EGR valve 32 is opened to introduce the EGR gas into the intake system while the vane opening control is performed. If the decision in this step is affirmative (Yes) and thus the EGR is under execution, the routine proceeds to Step S12'.

In Step S12' are set a target vane opening for the variable nozzles/vanes 67 and a target EGR valve opening for the EGR valve 32. In this instance, the target vane opening is set (target vane opening setting means) in accordance with the engine speed $N_e$ and the engine load, that is, the accelerator position $θ_{acc}$, as mentioned above, and the target EGR valve opening is set (target EGR valve opening setting means) in accordance with the engine speed $N_e$ and the fuel injection quantity $Q_f$.

Usually, the target value (predetermined value) $λ_1$ for the excess air ratio λ is also set in accordance with the operating state of the engine 1, and as the opening of the variable nozzles/vanes 67 changes, the exhaust gas or EGR gas is recirculated into the combustion chamber 2, as mentioned above, with the result that the excess air ratio λ varies depending on the EGR quantity. Accordingly, the fuel injection quantity $Q_f$ also is controlled in accordance with the target vane opening so that the excess air ratio λ may be kept at the target value $λ_1$. In other words, the target vane opening is set while controlling the excess air ratio λ to the target value $λ_1$. In practice, the fuel injection quantity $Q_f$ is read from the map prepared beforehand, as mentioned above.

Also, as the target value $λ_1$ changes, the quantity of the EGR gas introduced, that is, the target EGR valve opening, also changes with relation to the opening of the intake throttle valve 12 and the fuel injection quantity $Q_f$. Accordingly, the target EGR valve opening is set also based on the target value $λ_1$ for the excess air ratio λ. In practice, a map showing the relationship of the target EGR valve opening with the engine speed $N_e$, fuel injection quantity $Q_f$ and target value $λ_1$ is prepared beforehand by experiment, and an appropriate target EGR valve opening is read from the map.

In Step S14', the target vane opening and target EGR valve opening set in the aforementioned manner are corrected based on an actual excess air ratio λ detected by the λ sensor 26. The target vane opening and the target EGR valve opening are merely command values from the ECU 40 and are not actual values. Thus, even if the opening of the variable nozzles/vanes 67 is controlled so as to coincide with the target vane opening corresponding to the target value $\lambda_1$ and also the opening of the EGR valve 32 is controlled so as to coincide with the target EGR valve opening corresponding to the target value $\lambda_1$, a difference can occasionally arise between the actual opening of the variable nozzles/vanes 67 and the target vane opening or between the actual opening of the EGR valve 32 and the target EGR valve opening. Such an opening difference causes a similar difference between the target value $\lambda_1$ and the actual excess air ratio $\lambda$. Accordingly, the target value $\lambda_1$ is compared with the actual excess air ratio $\lambda$, and based on the result of comparison, the target vane opening and the target EGR valve opening are corrected so as to match their actual openings.

Specifically, a difference (absolute value) $|\lambda-\lambda_1|$ between the target value $\lambda_1$ and the actual excess air ratio $\lambda$ detected by the $\lambda$ sensor 26 is obtained, and the target vane opening and the target EGR valve opening are corrected by an amount corresponding to the difference. In this case, the target vane opening and the target EGR valve opening may be corrected as a whole based on the difference $|\lambda-\lambda_1|$.

In Step S16', the reference value for the fresh air quantity $Q_a$, that is, the fresh air quantity reference value, is set (fresh air quantity reference value setting means) in accordance with the target vane opening and the target EGR valve opening obtained as described above. Basically, the reference value for the fresh air quantity $Q_a$, or the fresh air quantity reference value, is set in accordance with the operating state (engine speed $N_e$, fuel injection quantity $Q_f$, engine torque, throttle opening, manifold air pressure, etc.) of the engine 1. In this step, the fresh air quantity reference value thus set is corrected by using the target vane opening and the target EGR valve opening. In practice, a map showing the relationship between the fresh air quantity $Q_a'$ applicable during the vane opening control and the target vane opening is prepared beforehand, a difference $(Q_a'-Q_{egr})$ between the fresh air quantity $Q_a'$ read from the map and an EGR gas quantity $Q_{egr}$ corresponding to the target EGR valve opening is obtained, and a reference value corresponding to the difference $(Q_a'-Q_{egr})$ is set as the fresh air quantity reference value. Alternatively, the reference value for the fresh air quantity $Q_a'$ not including the EGR gas may be corrected by using a value corresponding to the target EGR valve opening.

Since the target vane opening and the target EGR valve opening have been corrected as a whole to proper values matching the actual openings of the variable nozzles/vanes 67 and EGR valve 32, as mentioned above, the fresh air quantity reference value can be set to a highly accurate value as in the case where the exhaust flow rate is not adjusted with the variable nozzles/vanes 67 kept inoperative or the EGR gas is not introduced.

If the decision in Step S10 is negative (No) and it is judged that the vane opening control is not under execution, or if the decision in Step S11 is negative (No) and it is judged that no EGR gas is being introduced into the intake system, the routine proceeds to Step S20.

In this case, a fresh air quantity $Q_a$ normally obtained in accordance with the operating state of the engine 1 is set directly as the fresh air quantity reference value, without regard to the target vane opening or the target EGR valve opening.

Then, in Step S22, a difference (absolute value) $|S_{afs}\text{-reference value}|$ between the output signal $S_{afs}$ of the air flow sensor 14 and the fresh air quantity reference value is derived as X ($|S_{afs}\text{-reference value}|=X$), like the foregoing embodiments. Subsequently, in Step S24, it is determined whether or not the difference X has a value larger than or equal to the predetermined value $X_1$ (very small value) ($X \geqq X_1$). If the decision in this step is affirmative (Yes) and it is judged that the difference X is larger than or equal to the predetermined value $X_1$, it is concluded that failure of the air flow sensor 14 has occurred (failure detecting means), and the failure lamp 50 is turned on, in Step S28, to notify the driver of the failure of the air flow sensor 14. Also, in Step S30, the failure code corresponding to the failure of the air flow sensor 14 is recorded in a memory within the ECU 40.

Thus, even while the vane opening control of the variable nozzles/vanes 67 is performed and at the same time the EGR gas is introduced into the intake system, failure of the air flow sensor 14 can be detected with high accuracy, as in the first to third embodiments described above, whereby the reliability of the air flow sensor 14 can be improved.

FIG. 7 is a flowchart illustrating a control routine for air flow sensor (AFS) failure determination, executed in the failure detection apparatus according to the fifth embodiment of the present invention. In the following description of the flowchart, only the differences between the fourth and fifth embodiments will be explained.

In the fifth embodiment, after the target vane opening and the target EGR valve opening are set in Step S12', the fresh air quantity reference value is set immediately thereafter based on the target vane opening and the target EGR valve opening in Step S16', without correcting the target openings, unlike the fourth embodiment.

Then, in Step S17, it is determined whether or not the actual excess air ratio $\lambda$ detected by the $\lambda$ sensor 26 is equal to the target value $\lambda_1$ ($\lambda=\lambda_1$). If the decision in this step is affirmative (Yes) and it is judged that the actual excess air ratio $\lambda$ and the target value $\lambda_1$ are equal, it can be concluded that the target vane opening and the target EGR valve opening have been set to proper values matching their actual openings, and accordingly, the routine proceeds to Step S22.

On the other hand, if the decision in Step S17 is negative (No) and it is judged that the actual excess air ratio $\lambda$ and the target value $\lambda_1$ differ from each other, the opening of the variable nozzles/vanes 67 and the opening of the EGR valve 32 are corrected, in Step S18', such that the actual excess air ratio k becomes equal to the target value $\lambda_1$.

Namely, in the fourth embodiment, the target vane opening and the target EGR valve opening are corrected so as to match their actual openings. In the fifth embodiment, the actual openings of the variable nozzles/vanes 67 and EGR valve 32 are corrected so as to match their target openings.

Thus, the actual openings of the variable nozzles/vanes 67 and EGR valve 32 are corrected to proper values matching their target openings, and accordingly, the fresh air quantity reference value can be set to a highly accurate value as in the case where the exhaust flow rate is not adjusted with the variable nozzles/vanes 67 kept inoperative or the EGR gas is not introduced.

Consequently, failure of the air flow sensor 14 can be detected with precision, regardless of the adjustment of the exhaust flow rate through operation of the variable nozzles/vanes 67 or the introduction of the EGR gas, so that the reliability of the air flow sensor 14 can be improved.

FIG. 8 is a flowchart illustrating a control routine for air flow sensor (AFS) failure determination, executed in the failure detection apparatus according to the sixth embodiment of the present invention. In the following description of the flowchart, only the differences between the sixth embodiment and the fourth or fifth embodiment will be explained.

In the sixth embodiment, after the target vane opening and the target EGR valve opening are set in Step S12', the fresh air quantity reference value is set immediately thereafter based on the target vane opening and the target EGR valve opening in Step S16', like the fifth embodiment.

Then, in Step S17, it is determined whether or not the actual excess air ratio λ detected by the λ sensor 26 is equal to the target value $\lambda_1$ ($\lambda=\lambda_1$). If the decision in this step is affirmative (Yes) and it is judged that the actual excess air ratio λ and the target value $\lambda_1$ are equal, it can be concluded that the target vane opening and the target EGR valve opening have been set to proper values matching their actual openings, and accordingly, the routine proceeds to Step S22.

On the other hand, if the decision in Step S17 is negative (No) and it is judged that the actual excess air ratio λ and the target value $\lambda_1$ differ from each other, the vane opening control and the EGR control are suspended in Step S19', then a normally obtained fresh air quantity $Q_a$ is directly set as the fresh air quantity reference value in Step S20, and the routine proceeds to Step S22.

Namely, in the sixth embodiment, if there is a difference between the actual excess air ratio λ and the target value $\lambda_1$, it is concluded that the fresh air quantity reference value cannot be set with accuracy, and the vane opening control and the EGR control are suspended. Thus, using the fresh air quantity $Q_a$ normally obtained in accordance with the operating state of the engine 1 as the fresh air quantity reference value, the air flow sensor 14 is diagnosed, without operating the variable nozzles/vanes 67 for adjustment of the exhaust flow rate or introducing the EGR gas.

This permits the fresh air quantity reference value to be always set to an accurate value, without reducing the occasion for diagnosis and regardless of the degree to which the exhaust flow rate is adjusted by operating the variable nozzles/vanes 67 or to which the EGR gas is introduced. Also in this case, therefore, failure of the air flow sensor 14 can be detected with precision, making it possible to improve the reliability of the air flow sensor 14.

While the preferred embodiments of the present invention have been described, it should be noted that the present invention is not limited to the foregoing embodiments alone.

For example, in the foregoing embodiments, the λ sensor ($O_2$ sensor etc.) 26 is used as the exhaust concentration detecting means and the excess air ratio λ or air-fuel ratio of the exhaust system, which is detected by the λ sensor 26, is compared with the target value (predetermined value) $\lambda_1$. The present invention is, however, not limited to such configuration and may be provided with a means for detecting the concentration of gas flowing into the combustion chamber 2 so that the detected gas concentration may be compared with a predetermined value.

Further, although in the foregoing embodiments, a diesel engine is used as the engine 1, the engine 1 may alternatively be a gasoline engine.

What is claimed is:

1. A failure detection method implemented by a failure detection apparatus for an internal combustion engine, the failure detection apparatus including fresh air quantity detecting means for detecting a quantity of fresh air introduced into a combustion chamber of the engine, and a supercharger equipped with variable nozzles/vanes having a turbine and a compressor, the turbine being operated by an exhaust stream whose flow rate has been adjusted by the variable nozzles/vanes, to drive the compressor and thereby supercharge the engine with intake air, said failure detection method comprising:

a target vane opening setting step of setting a target vane opening for the variable nozzles/vanes in accordance with an operating state of the engine such that an air-fuel ratio or excess air ratio of an exhaust system of the engine becomes equal to a predetermined value corresponding to the operating state;

a vane opening control step of controlling the variable nozzles/vanes in accordance with the target vane opening set in said target vane opening setting step;

a fresh air quantity reference value setting step of setting a reference value for the fresh air quantity in accordance with the operating state of the engine and the target vane opening set for the variable nozzles/vanes in said target vane opening setting step; and a failure detecting step of detecting abnormality of the fresh air quantity detecting means, based on a result of comparison between the fresh air quantity detected by the fresh air quantity detecting means and the reference value set in said fresh air quantity reference value setting step.

2. The failure detection method according to claim 1, wherein said failure detection apparatus further includes exhaust concentration detecting means for detecting an exhaust concentration to thereby detect the air-fuel ratio or excess air ratio of the exhaust system, and said fresh air quantity reference value setting step comprises correcting the target vane opening for the variable nozzles/vanes based on a difference between the air-fuel ratio or excess air ratio of the exhaust system, detected by the exhaust concentration detecting means, and the predetermined value, and setting the reference value based on the corrected target vane opening.

3. The failure detection method according to claim 1, wherein said failure detection apparatus further includes exhaust concentration detecting means for detecting an exhaust concentration to thereby detect the air-fuel ratio or excess air ratio of the exhaust system, and said vane opening control step comprises correcting the opening of the variable nozzles/vanes such that the air-fuel ratio or excess air ratio of the exhaust system, detected by the exhaust concentration detecting means, coincides with the predetermined value.

4. The failure detection method according to claim 1, wherein said failure detection apparatus further includes exhaust concentration detecting means for detecting an exhaust concentration to thereby detect the air-fuel ratio or excess air ratio of the exhaust system, and if the air-fuel ratio or excess air ratio of the exhaust system, detected by the exhaust concentration detecting means, is different from the predetermined value, said fresh air quantity reference value setting step suspends the control of the variable nozzles/vanes in said vane opening control step and sets the reference value based solely on the operating state of the engine.

5. A failure detection method implemented by a failure detection apparatus for an internal combustion engine, the failure detection apparatus including fresh air quantity detecting means for detecting a quantity of fresh air introduced into a combustion chamber of the engine, a supercharger equipped variable nozzles/vanes having a turbine and a compressor, the turbine being operated by an exhaust stream whose flow rate has been adjusted by the variable nozzles/vanes, to drive the compressor and thereby supercharge the engine with intake air, an EGR passage for allowing part of exhaust gas to be recirculated from an exhaust system of the engine to an intake system of same as EGR gas, and an EGR valve inserted in the EGR passage for controlling a quantity of the EGR gas by varying an opening thereof, said failure detection method comprising:

a target vane opening setting step of setting a target vane opening for the variable nozzles/vanes in accordance with an operating state of the engine such that an air-fuel ratio or excess air ratio of the exhaust system becomes equal to a predetermined value corresponding to the operating state;

a vane opening control step of controlling the variable nozzles/vanes in accordance with the target vane opening set in said target vane opening setting step;

a target EGR valve opening setting step of setting a target EGR valve opening for the EGR valve in accordance with the operating state of the engine such that the air-fuel ratio or excess air ratio of the exhaust system becomes equal to the predetermined value;

an EGR valve control step of controlling the EGR valve in accordance with-the target EGR valve opening set in said target EGR valve opening setting step;

a fresh air quantity reference value setting step of setting a reference value for the fresh air quantity in accordance with the operating state of the engine, the target vane opening set for the variable nozzles/vanes in said target vane opening setting step, and the target EGR valve opening set in said target EGR valve opening setting step; and a failure detecting step of detecting abnormality of the fresh air quantity detecting means, based on a result of comparison between the fresh air quantity detected by the fresh air quantity detecting means and the reference value set in said fresh air quantity reference value setting step.

6. The failure detection method according to claim 5, wherein said failure detection apparatus further includes exhaust concentration detecting means for detecting an exhaust concentration to thereby detect the air-fuel ratio or excess air ratio of the exhaust system, and said fresh air quantity reference value setting step comprises correcting at least one of the target vane opening and the target EGR valve opening based on a difference between the air-fuel ratio or excess air ratio of the exhaust system, detected by the exhaust concentration detecting means, and the predetermined value, and setting the reference value based on said at least one of the corrected target vane opening and the corrected target EGR valve opening.

7. The failure detection method according to claim 5, wherein said failure detection apparatus further includes exhaust concentration detecting means for detecting an exhaust concentration to thereby detect the air-fuel ratio or excess air ratio of the exhaust system, said vane opening control step comprises correcting the opening of the variable nozzles/vanes such that the air-fuel ratio or excess air ratio of the exhaust system, detected by the exhaust concentration detecting means, coincides with the predetermined value, and said EGR valve control step comprises correcting the opening of the EGR valve such that the air-fuel ratio or excess air ratio of the exhaust system, detected by the exhaust concentration detecting means, coincides with the predetermined value.

8. The failure detection method according to claim 5, wherein said failure detection apparatus further includes exhaust concentration detecting means for detecting an exhaust concentration to thereby detect the air-fuel ratio or excess air ratio of the exhaust system, and if the air-fuel ratio or excess air ratio of the exhaust system, detected by the exhaust concentration detecting means, is different from the predetermined value, said fresh air quantity reference value setting step suspends the control of the variable nozzles/vanes in said vane opening control step as well as the control of the EGR valve in said EGR valve control step and sets the reference value based solely on the operating state of the engine.

9. A failure detection apparatus for an internal combustion engine, comprising:

fresh air quantity detecting means arranged in an intake system of the engine, for detecting a quantity of fresh air introduced into a combustion chamber of the engine;

fresh air quantity reference value setting means for setting a reference value for the fresh air quantity in accordance with an operating state of the engine;

failure detecting means for detecting abnormality of said fresh air quantity detecting means, based on a result of comparison between the fresh air quantity detected by said fresh air quantity detecting means and the reference value set by said fresh air quantity reference value setting means;

a supercharger equipped with variable nozzles/vanes arranged across the intake and exhaust systems of the engine and having a turbine and a compressor, the turbine being operated by an exhaust stream whose flow rate has been adjusted by the variable nozzles/vanes, to drive the compressor and thereby supercharge the engine with intake air;

target vane opening setting means for setting a target vane opening for the variable nozzles/vanes in accordance with the operating state of the engine such that an air-fuel ratio or excess air ratio of the exhaust system becomes equal to a predetermined value corresponding to the operating state; and vane opening control means for controlling the variable nozzles/vanes in accordance with the target vane opening set by said target vane opening setting means, wherein said fresh air quantity reference value setting means sets the reference value in accordance with not only the operating state of the engine but also the target vane opening set for the variable nozzles/vanes by said target vane opening setting means.

10. The failure detection apparatus according to claim 9, further comprising exhaust concentration detecting means for detecting an exhaust concentration to thereby detect the air-fuel ratio or excess air ratio of the exhaust system, wherein said fresh air quantity reference value setting means corrects the target vane opening for the variable nozzles/vanes, based on a difference between the air-fuel ratio or excess air ratio of the exhaust system, detected by said exhaust concentration detecting means, and the predetermined value, and sets the reference value based on the corrected target vane opening.

11. The failure detection apparatus according to claim 9, further comprising exhaust concentration detecting means for detecting an exhaust concentration to thereby detect the air-fuel ratio or excess air ratio of the exhaust system, wherein said vane opening control means corrects the opening of the variable nozzles/vanes such that the air-fuel ratio or excess air ratio of the exhaust system, detected by said exhaust concentration detecting means, coincides with the predetermined value.

12. The failure detection apparatus according to claim 9, further comprising exhaust concentration detecting means for detecting an exhaust concentration to thereby detect the air-fuel ratio or excess air ratio of the exhaust system, wherein, when the air-fuel ratio or excess air ratio of the exhaust system, detected by said exhaust concentration detecting means, is different from the predetermined value, said fresh air quantity reference value setting means suspends the control of the variable nozzles/vanes by said vane opening control means and sets the reference value based solely on the operating state of the engine.

13. A failure detection apparatus for an internal combustion engine, comprising:

fresh air quantity detecting means arranged in an intake system of the engine, for detecting a quantity of fresh air introduced into a combustion chamber of the engine;

fresh air quantity reference value setting means for setting a reference value for the fresh air quantity in accordance with an operating state of the engine;

failure detecting means for detecting abnormality of said fresh air quantity detecting means, based on a result of comparison between the fresh air quantity detected by said fresh air quantity detecting means and the reference value set by said fresh air quantity reference value setting means;

a supercharger equipped with variable nozzles/vanes arranged across the intake and exhaust systems of the engine and having a turbine and a compressor, the turbine being operated by an exhaust stream whose flow rate has been adjusted by the variable nozzles/vanes, to drive the compressor and thereby supercharge the engine with intake air;

target vane opening setting means for setting a target vane opening for the variable nozzles/vanes in accordance with the operating state of the engine such that an air-fuel ratio or excess air ratio of the exhaust system becomes equal to a predetermined value corresponding to the operating state;

vane opening control means for controlling the variable nozzles/vanes in accordance with the target vane opening set by said target vane opening setting means;

an EGR passage for allowing part of exhaust gas to be recirculated from the exhaust system of the engine to the intake system as EGR gas;

an EGR valve inserted in said EGR passage, for adjusting a quantity of the EGR gas by varying an opening thereof;

target EGR valve opening setting means for setting a target EGR valve opening for said EGR valve in accordance with the operating state of the engine such that the air-fuel ratio or excess air ratio of the exhaust system becomes equal to the predetermined value; and EGR valve control means for controlling said EGR valve in accordance with the target EGR valve opening set by said target EGR valve opening setting means, wherein said fresh air quantity reference value setting means sets the reference value in accordance with not only the operating state of the engine but also the target vane opening set for the variable nozzles/vanes by said target vane opening setting means and the target EGR valve opening set by said target EGR valve opening setting means.

14. The failure detection apparatus according to claim 13, further comprising exhaust concentration detecting means for detecting an exhaust concentration to thereby detect the air-fuel ratio or excess air ratio of the exhaust system, wherein said fresh air quantity reference value setting means corrects at least one of the target vane opening and the target EGR valve opening based on a difference between the air-fuel ratio or excess air ratio of the exhaust system, detected by said exhaust concentration detecting means, and the predetermined value, and sets the reference value based on said at least one of the corrected target vane opening and the corrected target EGR valve opening.

15. The failure detection apparatus according to claim 13, further comprising exhaust concentration detecting means for detecting an exhaust concentration to thereby detect the air-fuel ratio or excess air ratio of the exhaust system, wherein said vane opening control means corrects the opening of the variable nozzles/vanes such that the air-fuel ratio or excess air ratio of the exhaust system, detected by said exhaust concentration detecting means, coincides with the predetermined value, and said EGR valve control means corrects the opening of said EGR valve such that the air-fuel ratio or excess air ratio of the exhaust system, detected by said exhaust concentration detecting means, coincides with the predetermined value.

16. The failure detection apparatus according to claim 13, further comprising exhaust concentration detecting means for detecting an exhaust concentration to thereby detect the air-fuel ratio or excess air ratio of the exhaust system, wherein, when the air-fuel ratio or excess air ratio of the exhaust system, detected by said exhaust concentration detecting means, is different from the predetermined value, said fresh air quantity reference value setting means suspends the control of the variable nozzles/vanes by said vane opening control means as well as the control of said EGR valve by said EGR valve control means and sets the reference value based solely on the operating state of the engine.

* * * * *